Patented Oct. 29, 1929

1,733,776

UNITED STATES PATENT OFFICE

HOWARD M. CHILES, OF CHAMPAIGN, ILLINOIS, ASSIGNOR TO PYRO-PACK PRODUCTS CO., OF CHICAGO, ILLINOIS

METHOD OF PREPARING DI-IODO-FLUORESCEIN

No Drawing.   Application filed April 9, 1925.   Serial No. 21,766.

My invention relates to improvements in methods of preparing di-iodo-fluorescein and has for its object the provision of an improved method of procedure by means of which this substance may be readily and economically prepared and obtained.

Other objects will appear hereinafter.

The invention consists of the method of procedure hereinafter described and claimed.

In carrying out my process I dissolve 33.2 g. of fluorescein in 100 cc. of 95% alcohol. 25.4 g. of iodine is added and the whole heated under a condenser until the fluorescein is dissolved. 4.5 g. of potassium chlorate and 4.5 g. of copper sulfate dissolved in 15 cc. of water is added to the cooled alcoholic solution as oxidizing agents and then refluxed and heated for about two hours, thus forming the di-iodo-fluorescein in solution. The di-iodo-fluorescein is precipitated by diluting with two liters of water, being precipitated in the form of an amorphous powder somewhat more red than fluorescein, melting with decomposition above 300° C. The di-iodofluorescein is removed from the solution by filtration and has the graphical formula,

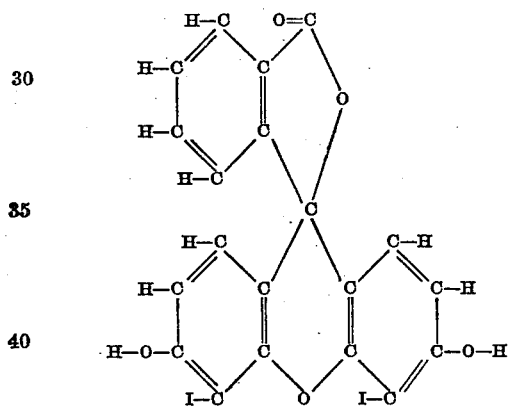

The amount of iodine used is just sufficient to form the di-iodo substitution product and for this purpose exactly two gramme atoms of iodine are employed. An equivalent amount of copper sulphate is used with potassium chlorate since cupric chlorate is soluble in alcohol.

While I have set forth the preferred method of producing the compound this is capable of some variation and modification without departing from the spirit of the invention. I, therefore, do not wish to be limited to the precise details set forth, but desire to avail myself of such variations and modifications as come within the scope of the appended claims.

Having described my invention, what I claim as new and desire to secure by Letters Patent is:

1. The method of preparing diiodo fluorescein which consists in treating fluorescein with two gramme atoms of iodine in the presence of potassium chlorate and copper sulphate as oxidizing agents in solution.

2. The method of preparing diiodo fluorescein which consists in oxidizing fluorescein in alcoholic solution with iodine by means of sulphate of copper and potassium chlorate added to said solution.

3. As an article of manufacture, diiodo fluorescein prepared by first dissolving fluorescein in alcohol, then adding iodine to the solution and heating, then adding a separate aqueous solution of potassium chlorate and copper sulphate to said first mentioned solution after cooling, then reheating the combined solutions over a space of time sufficient to form diiodo fluorescein, and finally precipitating the diiodo fluorescein by diluting the solution with a liberal addition of water.

4. The method of preparing di-iodo-fluorescein which consists in heating fluorescein with two gramme atoms of iodine in the presence of potassium chlorate and copper sulphate as oxidizing agents, substantially as described.

In testimony whereof I have signed my name to this specification.

HOWARD M. CHILES.